(12) United States Patent
Tsau

(10) Patent No.: US 11,284,058 B2
(45) Date of Patent: Mar. 22, 2022

(54) UTILIZING DUAL CAMERAS FOR CONTINUOUS CAMERA CAPTURE

(71) Applicant: Snap Inc., Santa Monica, CA (US)

(72) Inventor: Shu-Fong Tsau, Palatine, IL (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/886,071

(22) Filed: May 28, 2020

(65) Prior Publication Data

US 2020/0413028 A1 Dec. 31, 2020

Related U.S. Application Data

(60) Provisional application No. 62/866,090, filed on Jun. 25, 2019.

(51) Int. Cl.
*H04N 13/00* (2018.01)
*H04N 13/296* (2018.01)
*H04N 13/239* (2018.01)
*H04N 5/225* (2006.01)

(52) U.S. Cl.
CPC ....... *H04N 13/296* (2018.05); *H04N 5/22521* (2018.08); *H04N 13/239* (2018.05); *H04N 2213/008* (2013.01)

(58) Field of Classification Search
CPC ...... H04N 13/00; H04N 5/00; G02B 2027/00; G02B 27/00
See application file for complete search history.

(56) References Cited

U.S. PATENT DOCUMENTS

| | | | |
|---|---|---|---|
| 2014/0375789 A1 | 12/2014 | Lou et al. | |
| 2015/0304536 A1* | 10/2015 | Chiang | H04N 5/238 348/342 |
| 2017/0123234 A1 | 5/2017 | Sabovic et al. | |
| 2018/0329484 A1 | 11/2018 | Steedly et al. | |
| 2018/0332223 A1* | 11/2018 | Lin | H04N 5/2351 |
| 2019/0101977 A1* | 4/2019 | Armstrong-Muntner | G02B 27/017 |

FOREIGN PATENT DOCUMENTS

JP 2012147089 A 8/2012

OTHER PUBLICATIONS

International Search Report and Written Opinion for International Application No. PCT/US2020/034921, dated Sep. 9, 2020 (Sep. 9, 2020)—14 pages.

* cited by examiner

*Primary Examiner* — Maryam A Nasri
(74) *Attorney, Agent, or Firm* — Culhane Meadows PLLC; Stephen J. Weed

(57) ABSTRACT

An eyewear device that adjusts an on time and an off time of a pair of cameras to control heat of the cameras and of the eyewear device. Each of the pair of cameras has a duty cycle determining when the respective camera is on and off. A camera control chart contains the duty cycles. The eyewear may have a temperature sensor such that the on and off times of the cameras are a function of the temperature sensor.

18 Claims, 14 Drawing Sheets

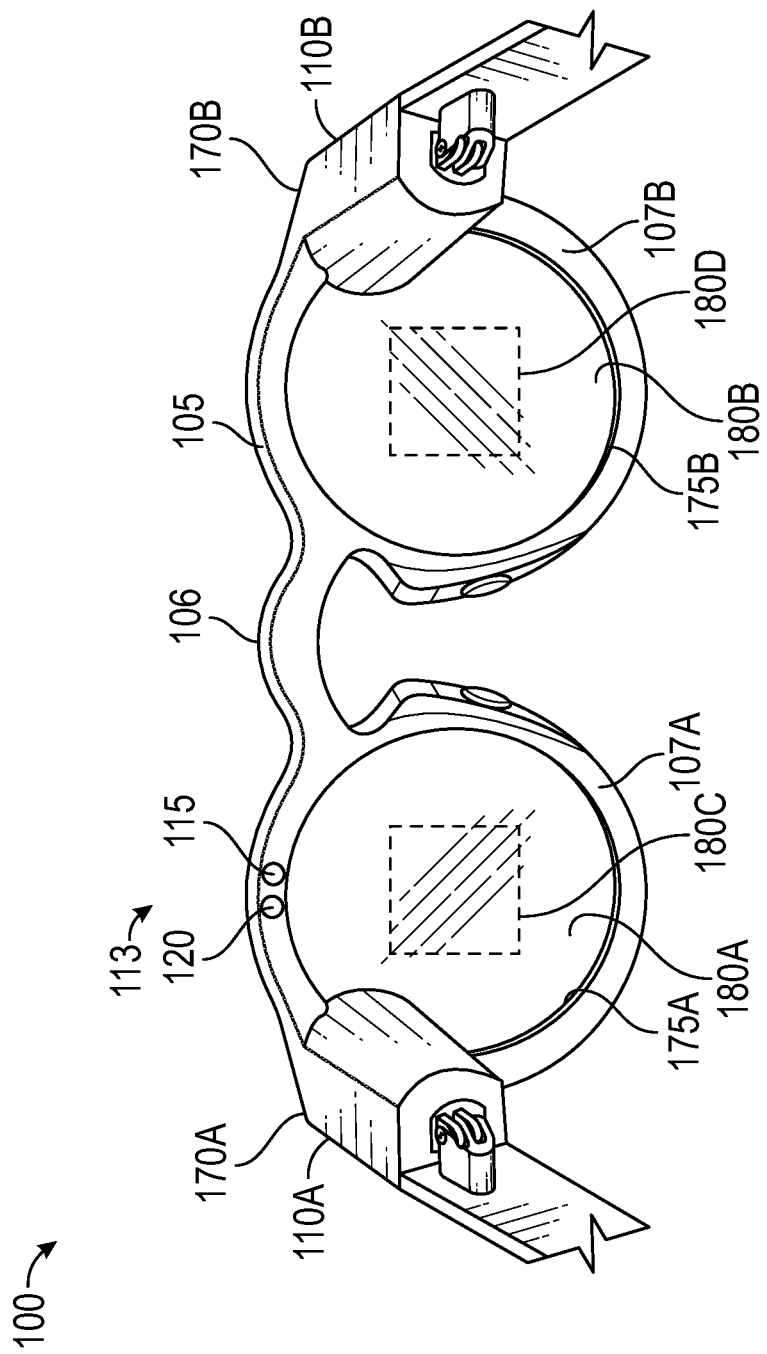

945

| Time Interval | Camera 1 | Camera 2 |
|---|---|---|
| n Seconds | On | Off |
| n Seconds | Off | On |
| n Seconds | On | Off |
| n Seconds | Off | On |
| n Seconds | On | Off |
| n Seconds | Off | On |
| n Seconds | On | Off |
| n Seconds | Off | On |

| Time Interval | Camera 1 | Camera 2 |
|---|---|---|
| m Seconds | On | Off |
| n Seconds | On | On |
| m Seconds | Off | On |
| n Seconds | On | On |
| m Seconds | On | Off |
| n Seconds | On | On |
| m Seconds | Off | On |
| n Seconds | On | On |
| m Seconds | On | Off |
| n Seconds | On | On |
| m Seconds | Off | On |
| n Seconds | On | On |

FIG. 9

UTILIZING DUAL CAMERAS FOR CONTINUOUS CAMERA CAPTURE

CROSS-REFERENCE TO RELATED APPLICATIONS

This application claims priority to U.S. Provisional Application Ser. No. 62/866,090 entitled UTILIZING DUAL CAMERAS FOR CONTINUOUS CAMERA CAPTURE, filed on Jun. 25, 2019, the contents of which are incorporated fully herein by reference.

TECHNICAL FIELD

The present subject matter relates to eyewear devices, e.g., smart glasses, including see-through displays and cameras.

BACKGROUND

Portable eyewear devices, such as smart glasses, headwear, and headgear available today integrate cameras and see-through displays. The cameras may produce stereo images and may be included in augmented reality (AR) eyewear.

BRIEF DESCRIPTION OF THE DRAWINGS

The drawing figures depict one or more implementations, by way of example only, not by way of limitations. In the figures, like reference numerals refer to the same or similar elements.

FIG. 2A is a rear view of an example hardware configuration of an eyewear device, which includes an eye scanner on a frame, for use in a system for identifying a user of the eyewear device;

FIG. 8 illustrates a first example of a camera control chart;

FIG. 9 illustrates another example of a camera control chart;

DETAILED DESCRIPTION

Figure 1A:
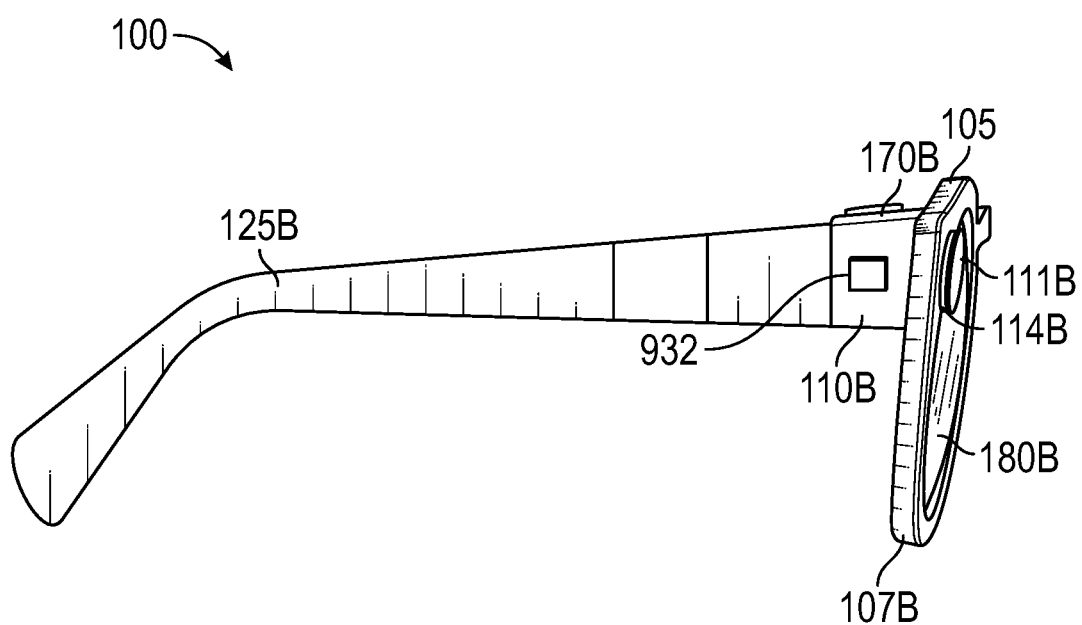
FIG. 1A is a side view of an example hardware configuration of an eyewear device, which shows a right optical element with an image display, and field of view adjustments are applied to a user interface presented on the image display based on detected head or eye movement by a user.

A drawback of continuous capture video devices in eyewear is that they may overheat easily. Utilizing alternating cameras that take turns capturing video helps ensure that neither camera gets too hot. An algorithm executed by a processor, such as stored in a camera control chart, controls the on and off times of each camera, such as a pair of cameras, to control the heat generated by each camera and also to control the heat generated in the eyewear. Various algorithms may be used, such as to uniformly alternate which camera is on with a 50 percent duty cycle, and to non-uniformly alternate which camera is on using non-uniform duty cycles such as to take into account that one camera is closer to eyewear electronics already creating heat in the eyewear. For example, the camera closer to the eyewear electronics may be on for less than 50% to the time. At least one camera is at least substantially always on, and sometimes both cameras may be on. The eyewear includes a temperature sensor whereby each camera on time and off time is a function of the temperature sensor.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

The orientations of the eyewear device, associated components and any complete devices incorporating an eye scanner and camera such as shown in any of the drawings, are given by way of example only, for illustration and discussion purposes. In operation for a particular variable optical processing application, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any optic or component of an optic constructed as otherwise described herein.

Reference now is made in detail to the examples illustrated in the accompanying drawings and discussed below.

FIG. 1A is a side view of an example hardware configuration of an eyewear device 100, which includes a right optical assembly 180B. Eyewear device 100 includes multiple visible light cameras 114A-B that form a stereo camera, of which the right visible light camera 114B is located in a right housing 110B.

The left and right visible light cameras 114A-B are sensitive to the visible light range wavelength. Each of the visible light cameras 114A-B have a different frontward facing angle of coverage, for example, visible light camera 114B has the depicted angle of coverage 111B. The angle of coverage is an angle range which the image sensor of the visible light camera 114A-B picks up electromagnetic radiation and generate images. Examples of such visible lights camera 114A-B include a high-resolution complementary metal-oxide-semiconductor (CMOS) image sensor and a video graphic array (VGA) camera, such as 640p (e.g., 640×480 pixels for a total of 0.3 m 3egapixels), 720p, or 1080p. Image sensor data from the visible light cameras 114A-B are captured along with geolocation data, digitized by an image processor, and stored in a memory.

To provide stereoscopic vision, visible light cameras 114A-B may be coupled to an image processor (element 912 of FIG. 11) for digital processing along with a timestamp in which the image of the scene is captured. Image processor 912 includes circuitry to receive signals from the visible light camera 114A-B and process those signals from the visible light camera 114 into a format suitable for storage in the memory. The timestamp can be added by the image processor or other processor, which controls operation of the visible light cameras 114A-B. Visible light cameras 114A-B allow the stereo camera to simulate human binocular vision. Stereo camera provides the ability to reproduce three-dimensional images based on two captured images from the visible light cameras 114A-B having the same timestamp. Such three-dimensional images allow for an immersive life-like experience, e.g., for virtual reality or video gaming. For stereoscopic vision, a pair of images is generated at a given moment in time-one image for each of the left and right visible light cameras 114A-B. When the pair of generated images from the frontward facing angles of coverage 111A-B of the left and right visible light cameras 114A-B are stitched together (e.g., by the image processor), depth perception is provided.

In an example, a user interface field of view adjustment system includes the eyewear device 100. The eyewear device 100 includes a frame 105, a right temple 110B extending from a right lateral side 170B of the frame 105, and a see-through image display 180D (FIGS. 2A-B) comprising optical element 180B to present a graphical user interface to a user. The optical element 180B can include, by way of non-limiting example, lenses (curved and non-curved), optical displays, and see-through displays. The eyewear device 100 includes a left visible light camera 114A connected to the frame 105 or the left temple 110A to capture a first image of the scene. Eyewear device 100 further includes a right visible light camera 114B connected to the frame 105 or the right temple 110B to capture (e.g., simultaneously with the left visible light camera 114A) a second image of the scene which partially overlaps the first image. Although not shown in FIGS. 1A-B, the user interface field of view adjustment system further includes a processor (element 932 of FIG. 11) coupled to the eyewear device 100 and connected to the visible light cameras 114A-B, a memory (element 934 of FIG. 11) accessible to the processor 932, and programming in the memory (element 934 of FIG. 11), for example in the eyewear device 100 itself or another part of the user interface field of view adjustment system.

Figure 1B:
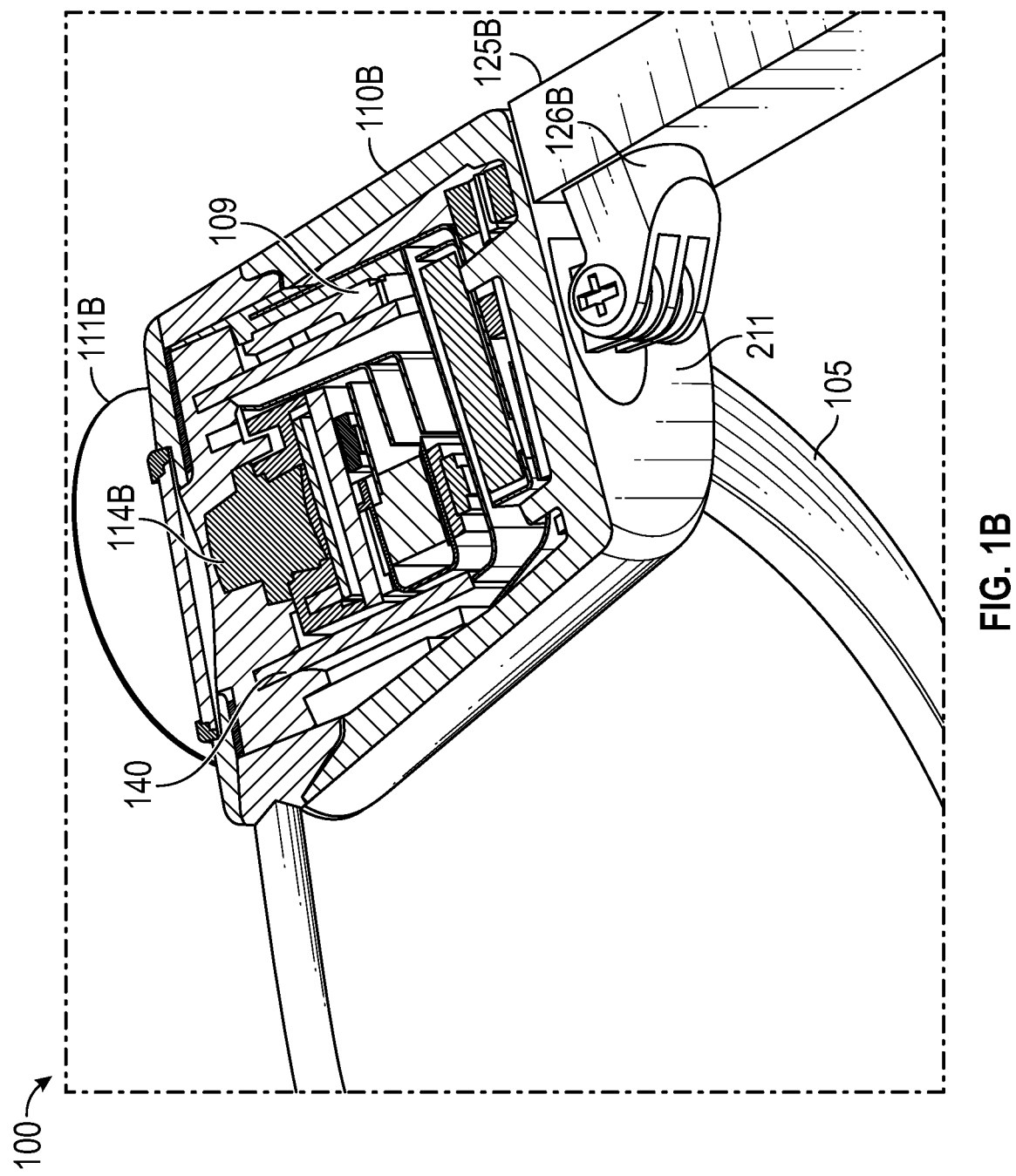
FIG. 1B is a top cross-sectional view of a housing of the eyewear device of FIG. 1A depicting a visible light camera, a head movement tracker for tracking the head movement of the user of the eyewear device, and a circuit board.
Figure 2B:
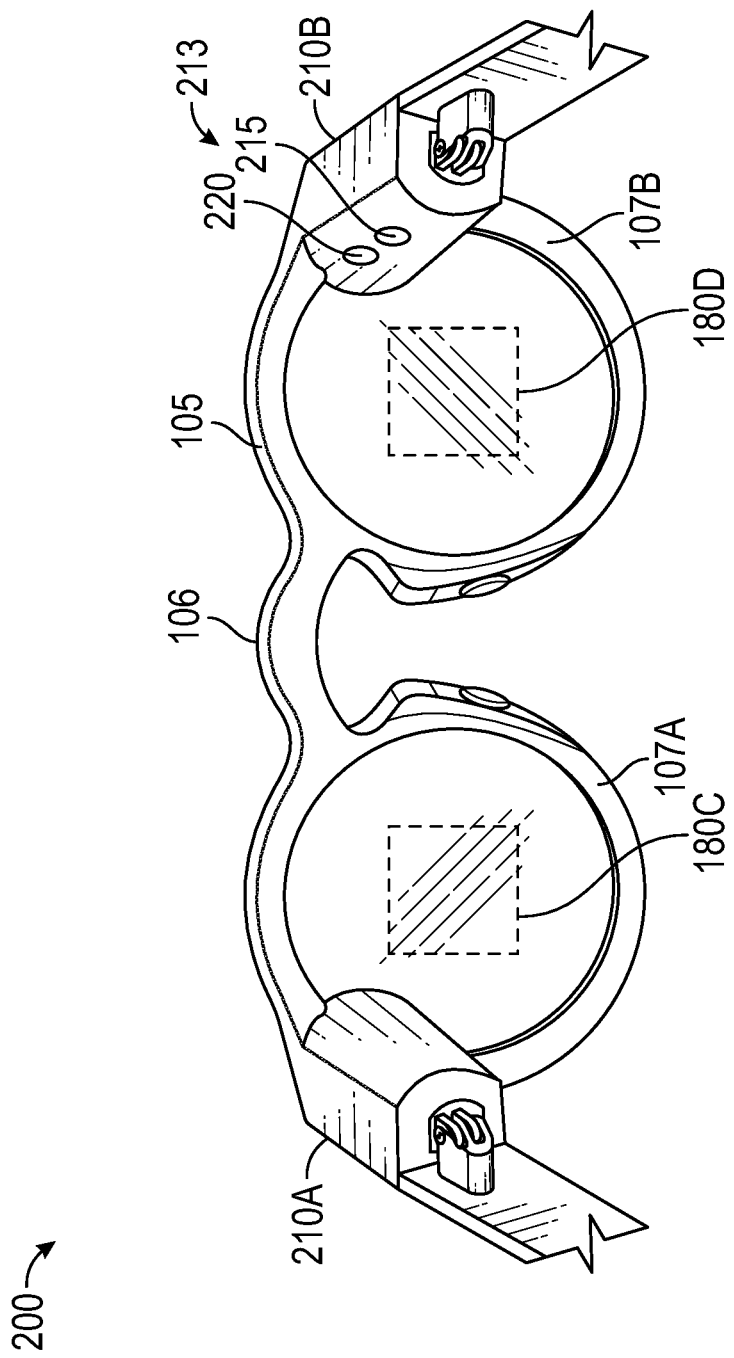
FIG. 2B is a rear view of an example hardware configuration of another eyewear device, which includes an eye scanner on a housing, for use in a system for identifying a user of the eyewear device.
Figure 5:
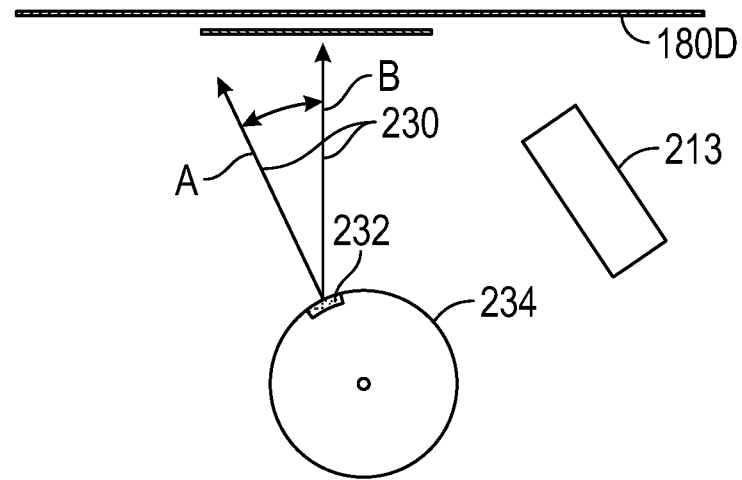
FIG. 5 illustrates detecting eye gaze direction.

Although not shown in FIG. 1A, the eyewear device 100 also includes a head movement tracker (element 109 of FIG. 1B) or an eye movement tracker (element 213 of FIGS. 2A-B). Eyewear device 100 further includes the see-through image displays 180C-D of optical elements 180A-B for presenting a sequence of displayed images, and an image display driver (element 942 of FIG. 11) coupled to the see-through image displays 180C-D of optical elements 180A-B to control the image displays 180C-D of optical elements 180A-B to present the sequence of displayed images, which are described in further detail below. Eyewear device 100 further includes the memory (element 934 of FIG. 11) and the processor (element 932 of FIG. 11) having access to the image display driver (element 942 of FIG. 11) and the memory (element 934 of FIG. 11). Eyewear device 100 further includes programming (element 934 of FIG. 11) in the memory. Execution of the programming by the processor (element 932 of FIG. 11) configures the eyewear device 100 to perform functions, including functions to present, via the see-through image displays 180C-D, an initial displayed image of the sequence of displayed images, the initial displayed image having an initial field of view corresponding to an initial head direction or an initial eye gaze direction (FIG. 5).

Execution of the programming by the processor (element 932 of FIG. 11) further configures the eyewear device 100 to detect movement of a user of the eyewear device by: (i) tracking, via the head movement tracker (element 109 of FIG. 1B), a head movement of a head of the user, or (ii) tracking, via the eye movement tracker (element 213 of FIGS. 2A-B, FIG. 5), an eye movement of an eye of the user of the eyewear device 100. Execution of the programming by the processor (element 932 of FIG. 11) further configures the eyewear device 100 to determine a field of view adjustment to the initial field of view of the initial displayed image based on the detected movement of the user. The field of view adjustment includes a successive field of view corresponding to a successive head direction or a successive eye direction. Execution of the programming by the processor (element 932 of FIG. 11) further configures the eyewear device 100 to generate a successive displayed image of the sequence of displayed images based on the field of view adjustment. Execution of the programming by the processor (element 932 of FIG. 11) further configures the eyewear device 100 to present, via the see-through image displays 180C-D of the optical elements 180A-B, the successive displayed image.

FIG. 1B is a top cross-sectional view of the housing of the eyewear device 100 of FIG. 1A depicting the right visible light camera 114B, a head movement tracker 109, and a circuit board. Construction and placement of the left visible light camera 114A is substantially similar to the right visible light camera 114B, except the connections and coupling are on the left lateral side 170A. As shown, the eyewear device 100 includes the right visible light camera 114B and a circuit board, which may be a flexible printed circuit board (PCB) 140. The right hinge 126B connects the right housing 110B to a right temple 125B of the eyewear device 100. In some examples, components of the right visible light camera 114B, the flexible PCB 140, or other electrical connectors or contacts may be located on the right temple 125B or the right hinge 126B.

As shown, eyewear device 100 has a head movement tracker 109, which includes, for example, an inertial measurement unit (IMU). An inertial measurement unit is an electronic device that measures and reports a body's specific force, angular rate, and sometimes the magnetic field surrounding the body, using a combination of accelerometers and gyroscopes, sometimes also magnetometers. The inertial measurement unit works by detecting linear acceleration using one or more accelerometers and rotational rate using one or more gyroscopes. Typical configurations of inertial measurement units contain one accelerometer, gyro, and magnetometer per axis for each of the three axes: horizontal axis for left-right movement (X), vertical axis (Y) for top-bottom movement, and depth or distance axis for up-down movement (Z). The accelerometer detects the gravity vector. The magnetometer defines the rotation in the magnetic field (e.g., facing south, north, etc.) like a compass which generates a heading reference. The three accelerometers to detect acceleration along the horizontal, vertical, and depth axis defined above, which can be defined relative to the ground, the eyewear device 100, or the user wearing the eyewear device 100.

Eyewear device 100 detects movement of the user of the eyewear device 100 by tracking, via the head movement tracker 109, the head movement of the head of the user. The head movement includes a variation of head direction on a horizontal axis, a vertical axis, or a combination thereof from the initial head direction during presentation of the initial displayed image on the image display. In one example, tracking, via the head movement tracker 109, the head movement of the head of the user includes measuring, via the inertial measurement unit 109, the initial head direction on the horizontal axis (e.g., X axis), the vertical axis (e.g., Y axis), or the combination thereof (e.g., transverse or diagonal movement). Tracking, via the head movement tracker 109, the head movement of the head of the user further includes measuring, via the inertial measurement unit 109, a successive head direction on the horizontal axis, the vertical axis, or the combination thereof during presentation of the initial displayed image.

Tracking, via the head movement tracker 109, the head movement of the head of the user further includes determining the variation of head direction based on both the initial head direction and the successive head direction. Detecting movement of the user of the eyewear device 100 further includes in response to tracking, via the head movement tracker 109, the head movement of the head of the user, determining that the variation of head direction exceeds a deviation angle threshold on the horizontal axis, the vertical axis, or the combination thereof. The deviation angle threshold is between about 3° to 10°. As used herein, the term "about" when referring to an angle means±10% from the stated amount.

Variation along the horizontal axis slides three-dimensional objects, such as characters, bitmojis, application icons, etc. in and out of the field of view by, for example, hiding, unhiding, or otherwise adjusting visibility of the three-dimensional object. Variation along the vertical axis, for example, when the user looks upwards, in one example, displays weather information, time of day, date, calendar appointments, etc. In another example, when the user looks downwards on the vertical axis, the eyewear device 100 may power down.

The right housing 110B includes housing body 211 and a housing cap, with the housing cap omitted in the cross-section of FIG. 1B. Disposed inside the right housing 110B are various interconnected circuit boards, such as PCBs or flexible PCBs, that include controller circuits for right visible light camera 114B, microphone(s), low-power wireless circuitry (e.g., for wireless short-range network communication via Bluetooth™), high-speed wireless circuitry (e.g., for wireless local area network communication via WiFi).

The right visible light camera 114B is coupled to or disposed on the flexible PCB 240 and covered by a visible light camera cover lens, which is aimed through opening(s) formed in the right housing 110B. In some examples, the frame 105 connected to the right housing 110B includes the opening(s) for the visible light camera cover lens. The frame 105 includes a front-facing side configured to face outwards away from the eye of the user. The opening for the visible light camera cover lens is formed on and through the front-facing side. In the example, the right visible light camera 114B has an outwards facing angle of coverage 111B with a line of sight or perspective of the right eye of the user of the eyewear device 100. The visible light camera cover lens can also be adhered to an outwards facing surface of the right housing 110B in which an opening is formed with an outwards facing angle of coverage, but in a different outwards direction. The coupling can also be indirect via intervening components.

Left (first) visible light camera 114A is connected to the left see-through image display 180C of left optical element 180A to generate a first background scene of a first successive displayed image. The right (second) visible light camera 114B is connected to the right see-through image display 180D of right optical element 180B to generate a second background scene of a second successive displayed image. The first background scene and the second background scene partially overlap to present a three-dimensional observable area of the successive displayed image.

Flexible PCB 140 is disposed inside the right housing 110B and is coupled to one or more other components housed in the right housing 110B. Although shown as being formed on the circuit boards of the right housing 110B, the right visible light camera 114B can be formed on the circuit boards of the left housing 110A, the temples 125A-B, or frame 105.

FIG. 2A is a rear view of an example hardware configuration of an eyewear device 100, which includes an eye scanner 113 on a frame 105, for use in a system for determining an eye position and gaze direction of a wearer/user of the eyewear device 100. As shown in FIG. 2A, the eyewear device 100 is in a form configured for wearing by a user, which are eyeglasses in the example of FIG. 2A. The eyewear device 100 can take other forms and may incorporate other types of frameworks, for example, a headgear, a headset, or a helmet.

In the eyeglasses example, eyewear device 100 includes the frame 105 which includes the left rim 107A connected to the right rim 107B via the bridge 106 adapted for a nose of the user. The left and right rims 107A-B include respective apertures 175A-B which hold the respective optical element 180A-B, such as a lens and the see-through displays 180C-D. As used herein, the term lens is meant to cover transparent or translucent pieces of glass or plastic having curved and flat surfaces that cause light to converge/diverge or that cause little or no convergence/divergence.

Although shown as having two optical elements 180A-B, the eyewear device 100 can include other arrangements, such as a single optical element depending on the application or intended user of the eyewear device 100. As further shown, eyewear device 100 includes the left housing 110A adjacent the left lateral side 170A of the frame 105 and the right housing 110B adjacent the right lateral side 170B of the frame 105. The housings 110A-B may be integrated into the frame 105 on the respective sides 170A-B (as illustrated) or implemented as separate components attached to the frame 105 on the respective sides 170A-B. Alternatively, the housings 110A-B may be integrated into temples (not shown) attached to the frame 105.

In the example of FIG. 2A, the eye scanner 113 includes an infrared emitter 115 and an infrared camera 120. Visible light cameras typically include a blue light filter to block infrared light detection, in an example, the infrared camera 120 is a visible light camera, such as a low-resolution video graphic array (VGA) camera (e.g., 640×480 pixels for a total of 0.3 megapixels), with the blue filter removed. The infrared emitter 115 and the infrared camera 120 are co-located on the frame 105, for example, both are shown as connected to the upper portion of the left rim 107A. The frame 105 or one or more of the left and right housings 110A-B include a circuit board (not shown) that includes the infrared emitter 115 and the infrared camera 120. The infrared emitter 115 and the infrared camera 120 can be connected to the circuit board by soldering, for example.

Other arrangements of the infrared emitter 115 and infrared camera 120 can be implemented, including arrangements in which the infrared emitter 115 and infrared camera 120 are both on the right rim 107B, or in different locations on the frame 105, for example, the infrared emitter 115 is on the left rim 107A and the infrared camera 120 is on the right rim 107B. In another example, the infrared emitter 115 is on the frame 105 and the infrared camera 120 is on one of the housings 110A-B, or vice versa. The infrared emitter 115 can be connected essentially anywhere on the frame 105, left housing 110A, or right housing 110B to emit a pattern of infrared light. Similarly, the infrared camera 120 can be connected essentially anywhere on the frame 105, left housing 110A, or right housing 110B to capture at least one reflection variation in the emitted pattern of infrared light.

The infrared emitter 115 and infrared camera 120 are arranged to face inwards towards an eye of the user with a partial or full field of view of the eye in order to identify the respective eye position and gaze direction. For example, the infrared emitter 115 and infrared camera 120 are positioned directly in front of the eye, in the upper part of the frame 105 or in the housings 110A-B at either ends of the frame 105.

FIG. 2B is a rear view of an example hardware configuration of another eyewear device 200. In this example configuration, the eyewear device 200 is depicted as including an eye scanner 213 on a right housing 210B. As shown, an infrared emitter 215 and an infrared camera 220 are co-located on the right housing 210B. It should be understood that the eye scanner 213 or one or more components of the eye scanner 213 can be located on the left housing 210A and other locations of the eyewear device 200, for example, the frame 205. The infrared emitter 215 and infrared camera 220 are like that of FIG. 2A, but the eye scanner 213 can be varied to be sensitive to different light wavelengths as described previously in FIG. 2A.

Similar to FIG. 2A, the eyewear device 200 includes a frame 105 which includes a left rim 107A which is connected to a right rim 107B via a bridge 106; and the left and right rims 107A-B include respective apertures which hold the respective optical elements 180A-B comprising the see-through display 180C-D.

Figure 2C:
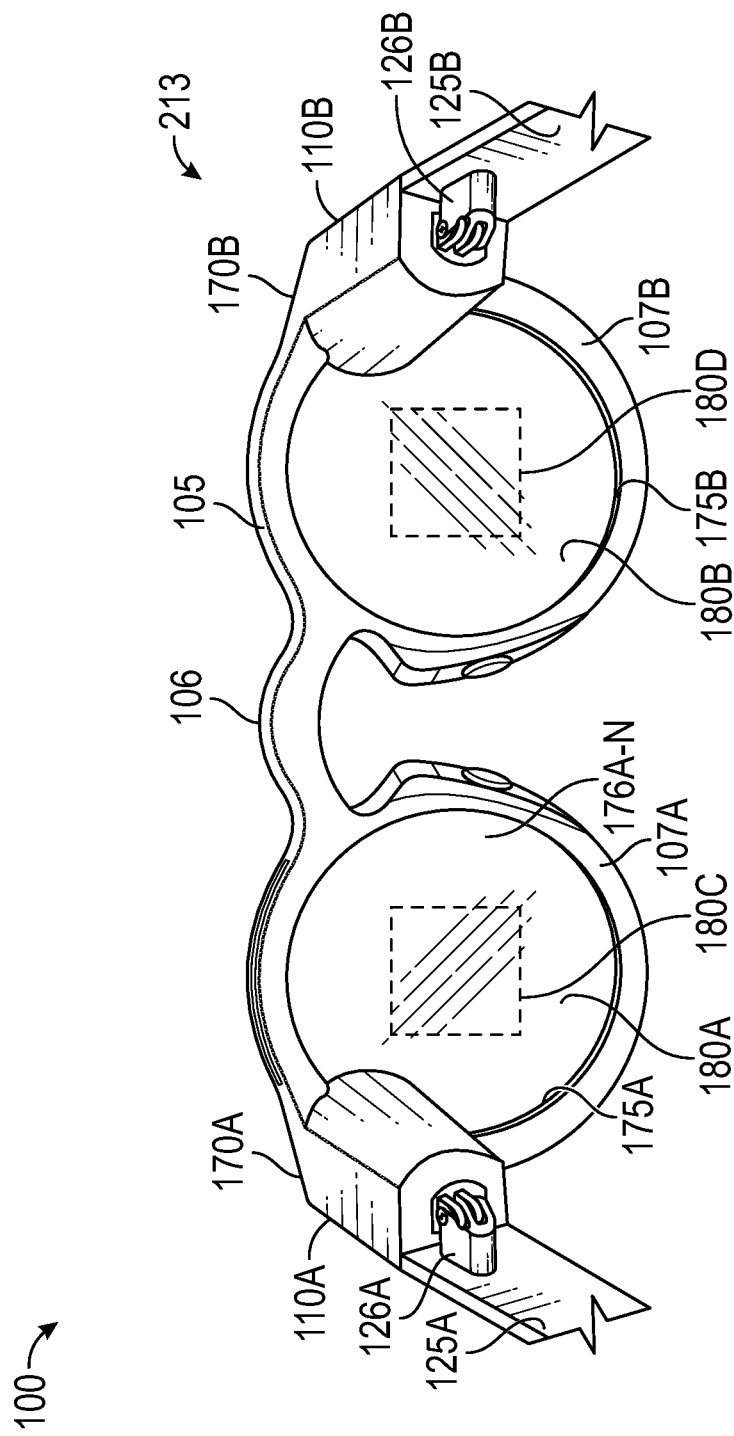
FIGS. 2C and 2D are rear views of example hardware configurations of the eyewear device, including two different types of image displays.
Figure 2D:
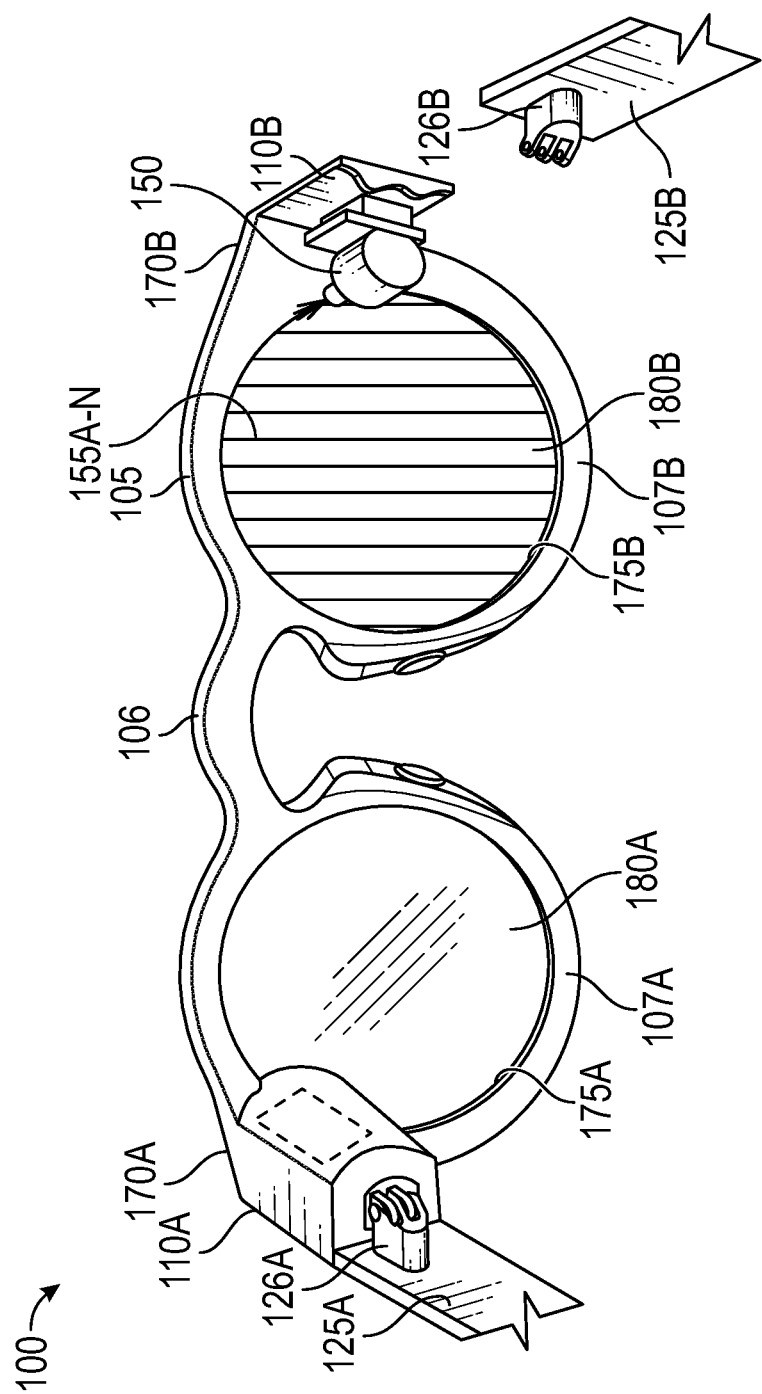

FIGS. 2C-D are rear views of example hardware configurations of the eyewear device 100, including two different types of see-through image displays 180C-D. In one example, these see-through image displays 180C-D of optical elements 180A-B include an integrated image display. As shown in FIG. 2C, the optical elements 180A-B includes a suitable display matrix 180C-D of any suitable type, such as a liquid crystal display (LCD), an organic light-emitting diode (OLED) display, a waveguide display, or any other such display. The optical elements 180A-B also includes an optical layer or layers 176, which can include lenses, optical coatings, prisms, mirrors, waveguides, optical strips, and other optical components in any combination. The optical layers 176A-N can include a prism having a suitable size and configuration and including a first surface for receiving light from display matrix and a second surface for emitting light to the eye of the user. The prism of the optical layers 176A-N extends over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism is sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the see-through image displays 180C-D, and the light travels through the prism so that the image viewed from the second surface is larger in one or more dimensions than the image emitted from the see-through image displays 180C-D.

In another example, the see-through image displays 180C-D of optical elements 180A-B include a projection image display as shown in FIG. 2D. The optical elements 180A-B includes a laser projector 150, which is a three-color laser projector using a scanning mirror or galvanometer. During operation, an optical source such as a laser projector 150 is disposed in or on one of the temples 125A-B of the eyewear device 100. Optical elements 180-B includes one or more optical strips 155A-N spaced apart across the width of the lens of the optical elements 180A-B or across a depth of the lens between the front surface and the rear surface of the lens.

As the photons projected by the laser projector 150 travel across the lens of the optical elements 180A-B, the photons encounter the optical strips 155A-N. When a particular photon encounters a particular optical strip, the photon is either redirected towards the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical elements 180A-B, the eyewear device 100 can include other arrangements, such as a single or three optical assemblies, or the optical elements 180A-B may have arranged different arrangement depending on the application or intended user of the eyewear device 100.

As further shown in FIGS. 2C-D, eyewear device 100 includes a left housing 110A adjacent the left lateral side 170A of the frame 105 and a right housing 110B adjacent the right lateral side 170B of the frame 105. The housings 110A-B may be integrated into the frame 105 on the respective lateral sides 170A-B (as illustrated) or implemented as separate components attached to the frame 105 on the respective sides 170A-B. Alternatively, the housings 110A-B may be integrated into temples 125A-B attached to the frame 105.

In one example, the see-through image displays include the first see-through image display 180C and the second see-through image display 180D. Eyewear device 100 includes first and second apertures 175A-B which hold the respective first and second optical elements 180A-B. The first optical element 180A includes the first see-through image display 180C (e.g., a display matrix of FIG. 2C or optical strips 155A-N' and a projector 150A). The second optical element 180B includes the second see-through image display 180D e.g., a display matrix of FIG. 2C or optical strips 155A-N" and a projector 150B). The successive field of view of the successive displayed image includes an angle of view between about 15° to 30, and more specifically 24°, measured horizontally, vertically, or diagonally. The successive displayed image having the successive field of view represents a combined three-dimensional observable area visible through stitching together of two displayed images presented on the first and second image displays.

As used herein, "an angle of view" describes the angular extent of the field of view associated with the displayed images presented on each of the left and right image displays 180C-D of optical elements 180A-B. The "angle of coverage" describes the angle range that a lens of visible light cameras 114A-B or infrared camera 220 can image. Typically, the image circle produced by a lens is large enough to cover the film or sensor completely, possibly including some vignetting (i.e., a reduction of an image's brightness or saturation toward the periphery compared to the image center). If the angle of coverage of the lens does not fill the sensor, the image circle will be visible, typically with strong vignetting toward the edge, and the effective angle of view will be limited to the angle of coverage. The "field of view" is intended to describe the field of observable area which the user of the eyewear device 100 can see through his or her eyes via the displayed images presented on the left and right image displays 180C-D of the optical elements 180A-B. Image display 180C of optical elements 180A-B can have a field of view with an angle of coverage between 15° to 110°, for example 24°, and have a resolution of 480×480 pixels or greater.

Figure 3:
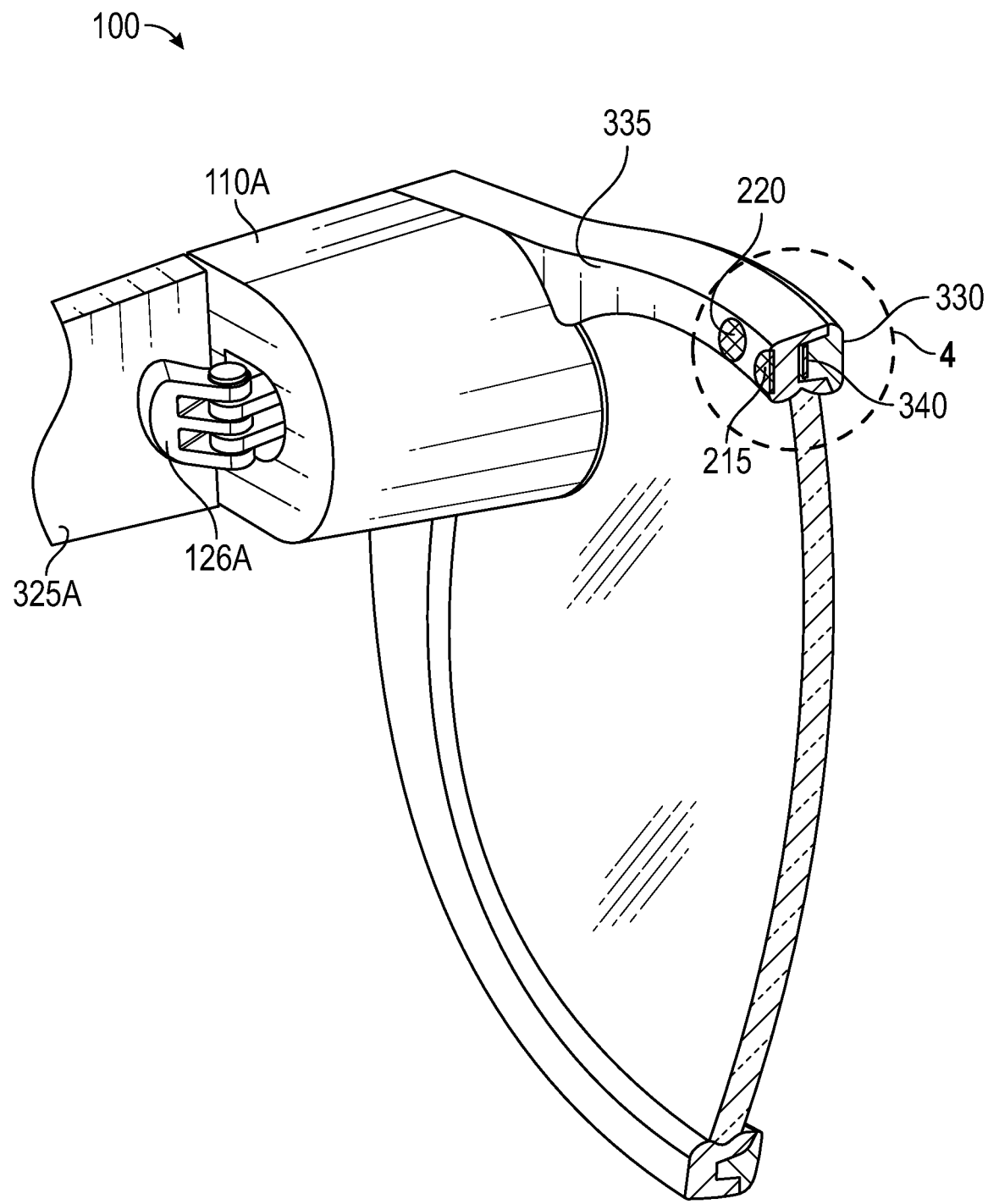
FIG. 3 shows a rear perspective view of the eyewear device of FIG. 2A depicting an infrared emitter, an infrared camera, a frame front, a frame back, and a circuit board.

FIG. 3 shows a rear perspective view of the eyewear device of FIG. 2A. The eyewear device 100 includes an infrared emitter 215, infrared camera 220, a frame front 330, a frame back 335, and a circuit board 340. It can be seen in FIG. 3 that the upper portion of the left rim of the frame of the eyewear device 100 includes the frame front 330 and the frame back 335. An opening for the infrared emitter 215 is formed on the frame back 335.

As shown in the encircled cross-section 4-4 in the upper middle portion of the left rim of the frame, a circuit board, which is a flexible PCB 340, is sandwiched between the frame front 330 and the frame back 335. Also shown in further detail is the attachment of the left housing 110A to the left temple 325A via the left hinge 126A. In some examples, components of the eye movement tracker 213, including the infrared emitter 215, the flexible PCB 340, or other electrical connectors or contacts may be located on the left temple 325A or the left hinge 126A.

Figure 4:
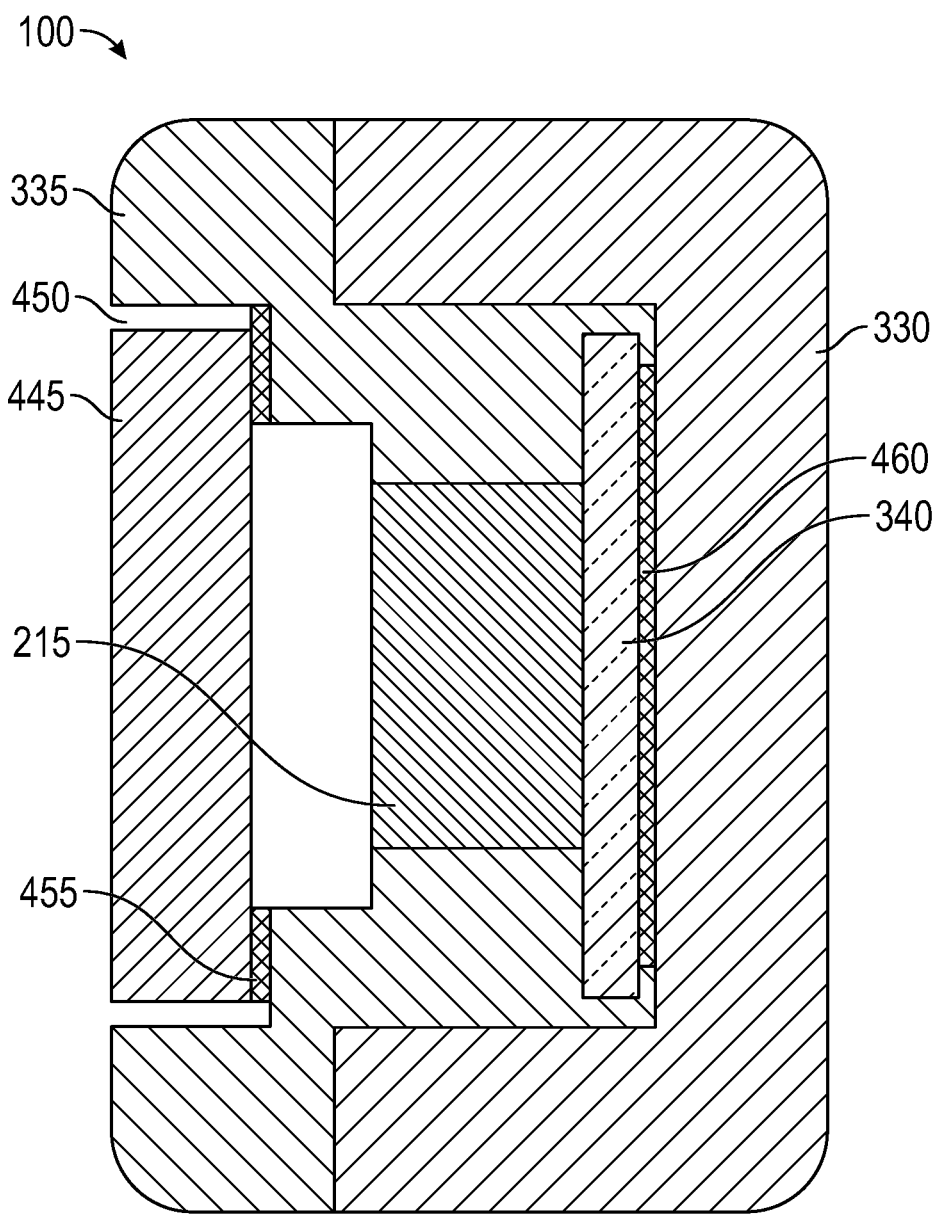
FIG. 4 is a cross-sectional view taken through the infrared emitter and the frame of the eyewear device of FIG. 3.

FIG. 4 is a cross-sectional view through the infrared emitter 215 and the frame corresponding to the encircled cross-section 4-4 of the eyewear device of FIG. 3. Multiple layers of the eyewear device 100 are illustrated in the cross-section of FIG. 4, as shown the frame includes the frame front 330 and the frame back 335. The flexible PCB 340 is disposed on the frame front 330 and connected to the frame back 335. The infrared emitter 215 is disposed on the flexible PCB 340 and covered by an infrared emitter cover lens 445. For example, the infrared emitter 215 is reflowed to the back of the flexible PCB 340. Reflowing attaches the infrared emitter 215 to contact pad(s) formed on the back of the flexible PCB 340 by subjecting the flexible PCB 340 to controlled heat which melts a solder paste to connect the two components. In one example, reflowing is used to surface mount the infrared emitter 215 on the flexible PCB 340 and electrically connect the two components. However, it should be understood that through-holes can be used to connect leads from the infrared emitter 215 to the flexible PCB 340 via interconnects, for example.

The frame back 335 includes an infrared emitter opening 450 for the infrared emitter cover lens 445. The infrared emitter opening 450 is formed on a rear-facing side of the frame back 335 that is configured to face inwards towards the eye of the user. In the example, the flexible PCB 340 can be connected to the frame front 330 via the flexible PCB adhesive 460. The infrared emitter cover lens 445 can be connected to the frame back 335 via infrared emitter cover lens adhesive 455. The coupling can also be indirect via intervening components.

Figure 6:
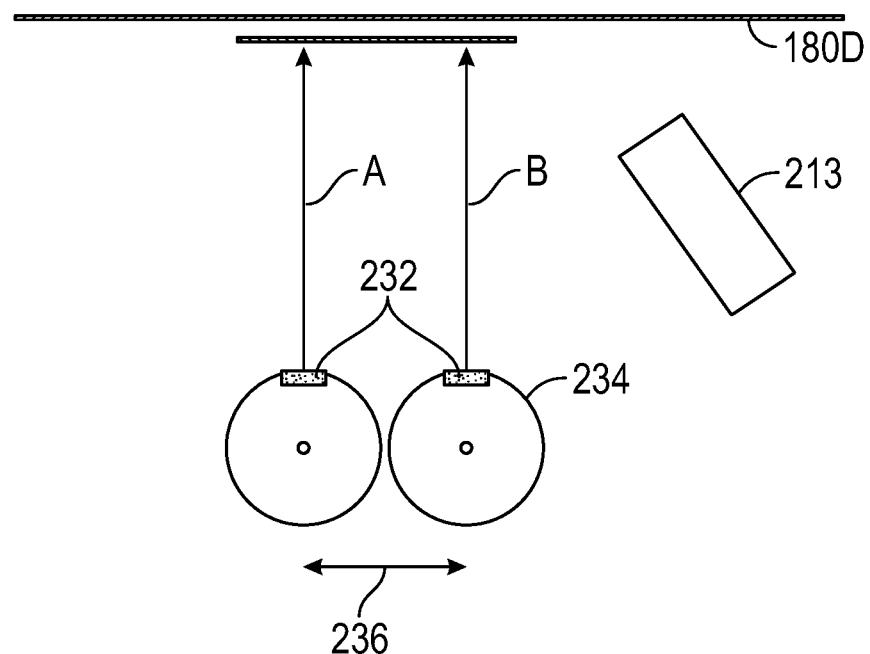
FIG. 6 illustrates detecting eye position.

In an example, the processor (element 932 of FIG. 11) utilizes eye tracker 213 to determine an eye gaze direction 230 of a wearer as shown in FIG. 5, and an eye position 236 of the wearer within an eyebox as shown in FIG. 6. The eye tracker 213 is a scanner which uses infrared light illumination (e.g., near-infrared, short-wavelength infrared, mid-wavelength infrared, long-wavelength infrared, or far infrared) to captured image of reflection variations of infrared light from the eye to determine the gaze direction 230 of a pupil 232 of an eye 234, and also the eye position 236 with respect to the see-through display 180D.

Figure 7:
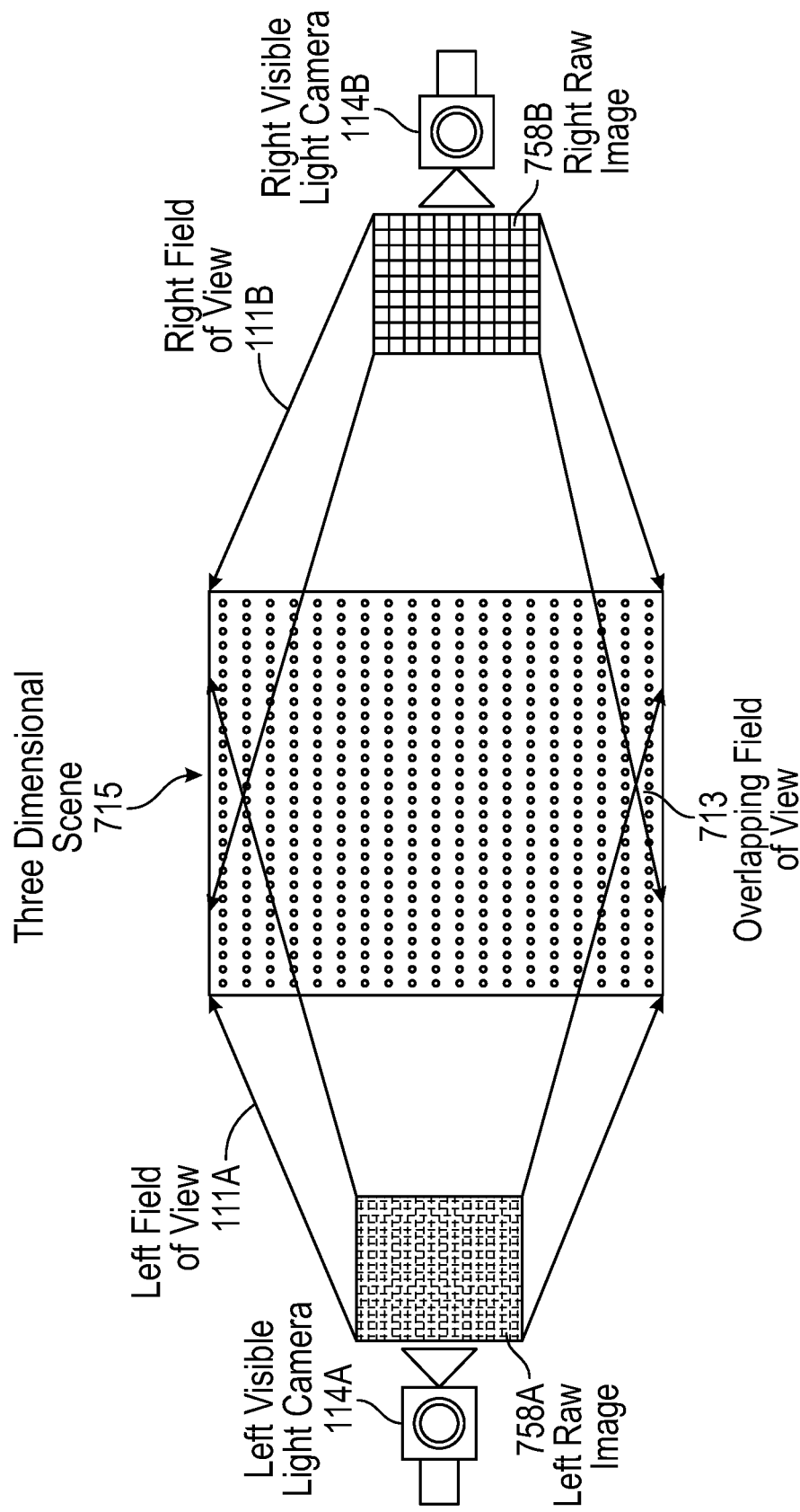
FIG. 7 depicts an example of visible light captured by the left visible light camera as a left raw image and visible light captured by the right visible light camera as a right raw image.
Figure 11:
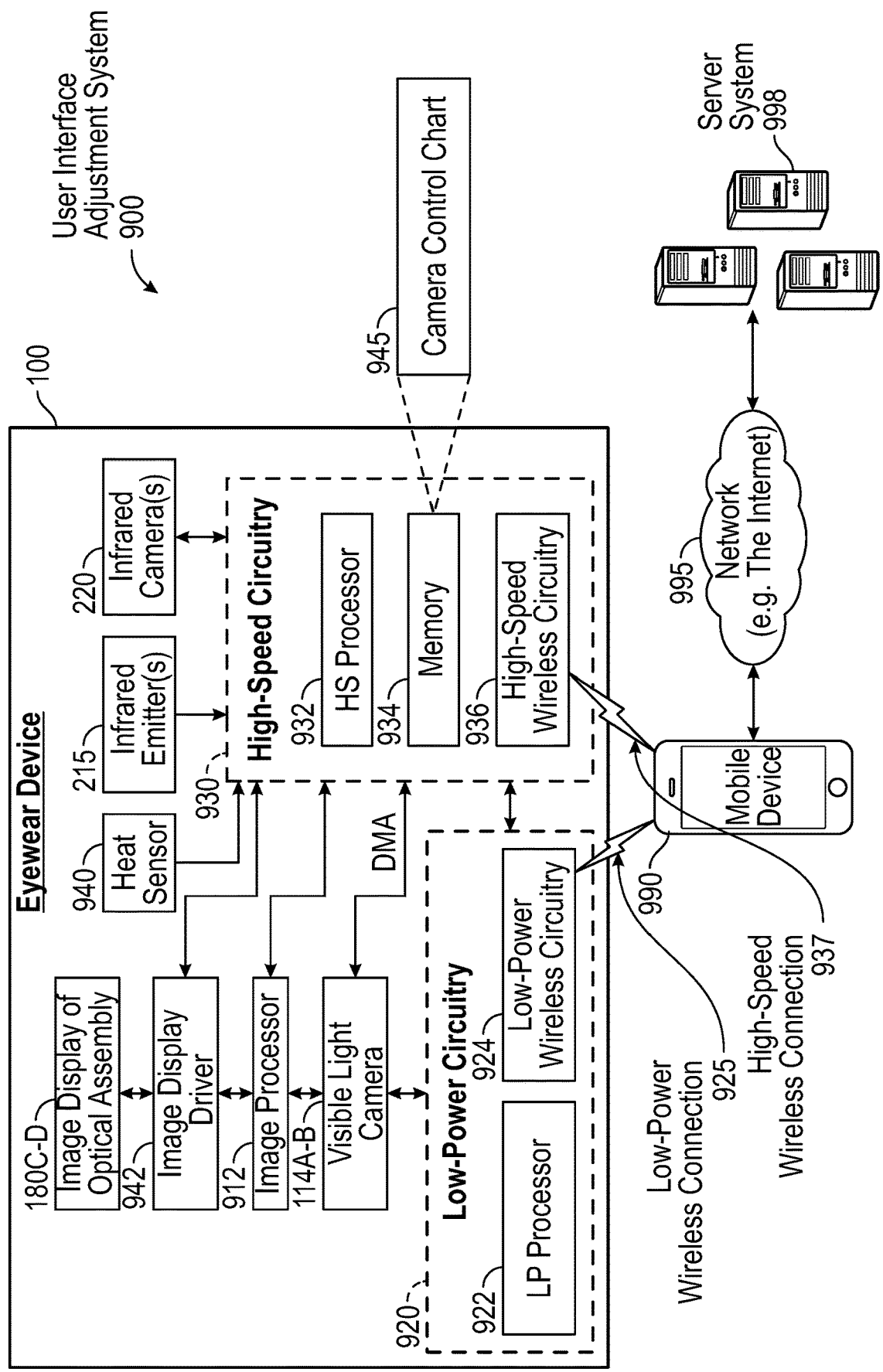
FIG. 11 shows a block diagram of electronic components of the eyewear device.

FIG. 7 depicts an example of capturing visible light with cameras. Visible light is captured by the left visible light camera 114A with a left visible light camera field of view 111A as a left raw image 758A. Visible light is captured by the right visible light camera 114B with a right visible light camera field of view 111B as a right raw image 758B. Based on processing of the left raw image 758A and the right raw image 758B, a three-dimensional depth map 715 of a three-dimensional scene is generated by processor 932 (FIG. 11).

Referring to FIG. 8, there is shown a first example of a camera control chart 945 stored in memory (element 934 in FIG. 11) that is used by a processor (element 932 in FIG. 11) to control the on and off time of cameras 114A and 114B. In this example, the left visible light camera 114A (labeled camera 1) is on for n seconds, for example 10 seconds, while the right visible light camera 114B is off. Then, the right visible light camera 114B (labeled camera 2) is on n seconds, while the left visible light camera 114B is off. This pattern repeats. In one example, as shown in FIG. 8, the left and right visible light cameras 114A-B are on and off equal times, such that there is a 50 percent duty cycle for each camera.

In one example, the visible light cameras 114A-B are each set up to capture video at 36 frames per second (i.e., twice the minimum threshold for perception of fluid motion) or greater. Each visible light camera 114A-B camera is turned on to capture one or more frames and then off while the other camera captures one or more frames. The images created by one or both cameras 114A-B are transmitted by a transmitter (element 937 FIG. 937) for example by streaming to a display of user devices (element 990 FIG. 11) for viewing by other users. When both cameras 114A-B are on the images are rendered as a mono or stereo image, and when only one camera is on the images are rendered as a mono image. Filtering may be performed on the images by the processor (element 932 FIG. 11). Image processing can allow for smooth transition of video from left camera to right camera and vice-versa.

In another example, one camera is on longer than the other camera such that there is a greater than 50 percent duty cycle for one camera, and less than a 50 percent duty cycle for the other camera such as a camera placed closer to a processor (element 932 FIG. 11) of eyewear 100. This example helps to keep each camera from getting too hot, and also to reduce the heat generated in the eyewear 100 proximate to the processor.

In one example, one camera is always on and the other camera is always off. In another example, there is a gap (e.g., a visually imperceptible gap) between when one camera is turned off and the other camera is turned off. In another example, there is some overlap in which one camera is turned on before the other camera is turned off.

Referring to FIG. 9, there is shown another example of a camera control chart 945 configured such that the processor sometimes turns both cameras on, and at other times only turns one camera on while the other camera is off. This example ensures that in the last n seconds only one camera was on for n seconds and the other camera was off for n seconds. For example, for the first m seconds, only camera 1 is on and camera 2 is off. For the next n seconds, both cameras are on. For the next m seconds, only camera 2 is on and camera 1 is off. For the next n seconds, both cameras are on again. This pattern repeats, such that only one camera is on every n seconds, and that both cameras are on every n seconds as well. In one example, n can be 10 seconds, although the value of n can be less than or greater that 10 seconds. Time m can be greater than, equal to, or shorter than time n.

In another example, the time one camera is on may be greater or less than the time both cameras are on. In another example, one camera can be off longer that the other to control the amount of heat generated by each camera and to control the overall heat throughout the eyewear 100.

Figure 10:
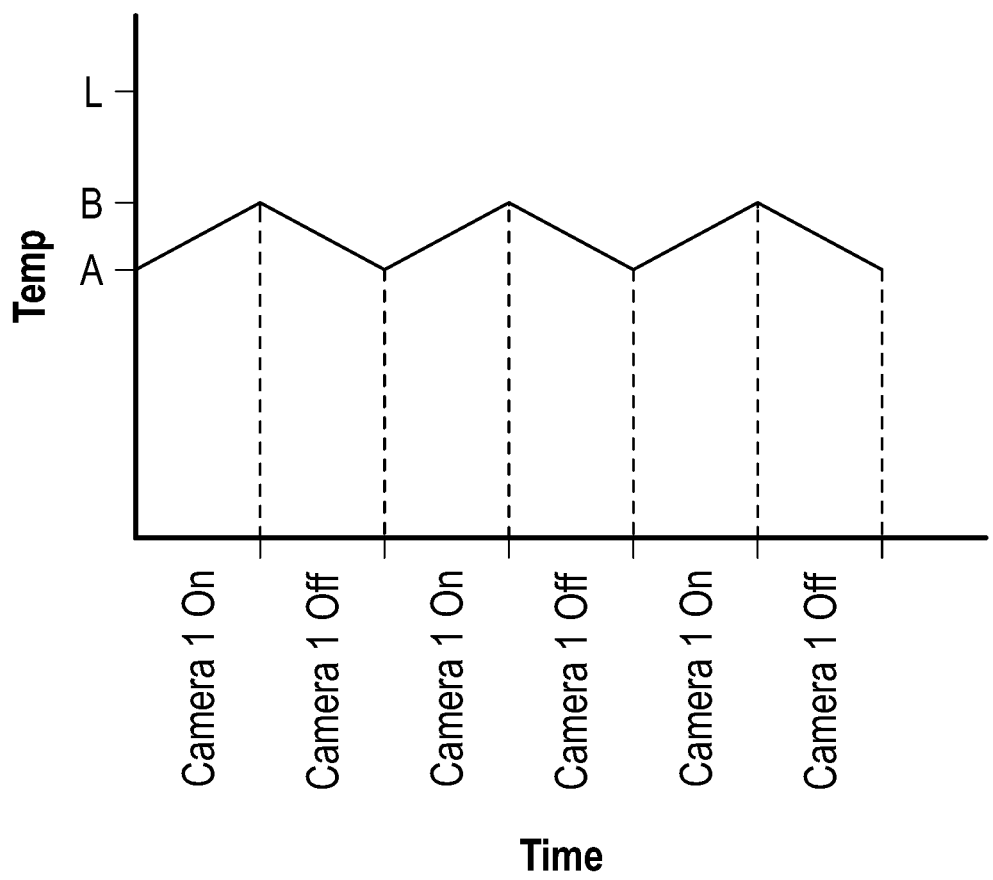
FIG. 10 illustrates a graph of temperature as a function of the cameras turning on and off.

FIG. 10 illustrates a graph of the temperature of the housing 110B proximate the processor 932 as shown in FIG. 1A. The housing 110B temperature is determined by a temperature sensor (element 940 FIG. 11) coupled to the housing 110B proximate the processor 932. In another example, the temperature sensor 940 may form part of the processor 932 on-chip and provide the temperature of the processor 932. The graph shown in FIG. 10 corresponds to the camera control chart 945 shown in FIG. 8 where there is a 50 percent duty cycle for each of camera 1 and camera 2. As shown, the temperature of the housing 110B or processor 932 varies between temperature A and temperature B as one of the cameras is on and off, which temperatures are controlled at least in part by varying the on time of the cameras to be below a high temperature limit L to avoid the cameras 114A-B from getting too hot, and to reduce the heat in the housing 110B.

FIG. 11 depicts a high-level functional block diagram including example electronic components disposed in eyewear 100 and 200. The illustrated electronic components include the processor 932, temperature sensor 940, the memory 934, which includes static or dynamic memory or a combination thereof, and which includes the camera control chart 945 shown in FIG. 8 and FIG. 9 to control the on time and off time of the cameras 114A-B, such as to control heat in the eyewear 100.

Processor 932 includes instructions for execution by processor 932 to implement functionality of eyewear 100/200 including instructions for processor 932 to control the on time and off time of the cameras 114A-B. Processor 932 receives power from battery (not shown) and executes instructions stored in memory 934, or integrated with the processor 932 on-chip, to perform functionality of eyewear 100/200 such as image processing of see-through display 180D, controlling operation of eyewear 100/200, and communicating with external devices via wireless connections.

A user interface adjustment system 900 includes a wearable device, which is the eyewear device 100 with an eye movement tracker 213 (e.g., shown as infrared emitter 215 and infrared camera 220 in FIG. 2B). User interface adjustments system 900 also includes a mobile device 990 and a server system 998 connected via various networks. Mobile device 990 may be a smartphone, tablet, laptop computer, access point, or any other such device capable of connecting with eyewear device 100 using both a low-power wireless connection 925 and a high-speed wireless connection 937. Mobile device 990 is connected to server system 998 and network 995. The network 995 may include any combination of wired and wireless connections.

Eyewear device 100 includes at least two visible light cameras 114A-B (one associated with the left lateral side 170A and one associated with the right lateral side 170B). Eyewear device 100 further includes two see-through image displays 180C-D of the optical elements 180A-B (one associated with the left lateral side 170A and one associated with the right lateral side 170B). Eyewear device 100 also includes image display driver 942, image processor 912, low-power circuitry 920, and high-speed circuitry 930. The components shown in FIG. 11 for the eyewear device 100 are located on one or more circuit boards, for example a PCB or flexible PCB, in the temples. Alternatively or additionally, the depicted components can be located in the housings, frames, hinges, or bridge of the eyewear device 100. Left and right visible light cameras 114A-B can include digital camera elements such as a complementary metal-oxide-semiconductor (CMOS) image sensor, charge coupled device, a lens, or any other respective visible or light capturing elements that may be used to capture data, including images of scenes with unknown objects.

Memory 934 further includes the camera control chart 945 to perform the functions described herein, including the user interface field of view adjustment interactions with the displayed content presented on left and right see-through image displays 180C-D of optical elements 180A-B.

Eye movement tracking programming implements the user interface field of view adjustment instructions, including, to cause the eyewear device 100 to track, via the eye movement tracker 213, the eye movement of the eye of the user of the eyewear device 100. Other implemented instructions (functions) cause the eyewear device 100 to determine, a field of view adjustment to the initial field of view of an initial displayed image based on the detected eye movement of the user corresponding to a successive eye direction. Further implemented instructions generate a successive displayed image of the sequence of displayed images based on the field of view adjustment. The successive displayed image is produced as visible output to the user via the user interface. This visible output appears on the see-through image displays 180C-D of optical elements 180A-B, which is driven by image display driver 934 to present the sequence of displayed images, including the initial displayed image with the initial field of view and the successive displayed image with the successive field of view.

As shown in FIG. 11, high-speed circuitry 930 includes high-speed processor 932, memory 934, and high-speed wireless circuitry 936. In the example, the image display driver 942 is coupled to the high-speed circuitry 930 and operated by the high-speed processor 932 in order to drive the left and right image displays 180C-D of the optical elements 180A-B. High-speed processor 932 may be any processor capable of managing high-speed communications and operation of any general computing system needed for eyewear device 100. High-speed processor 932 includes processing resources needed for managing high-speed data transfers on high-speed wireless connection 937 to a wireless local area network (WLAN) using high-speed wireless circuitry 936. In certain embodiments, the high-speed processor 932 executes an operating system such as a LINUX operating system or other such operating system of the eyewear device 100 and the operating system is stored in memory 934 for execution. In addition to any other responsibilities, the high-speed processor 932 executing a software architecture for the eyewear device 100 is used to manage data transfers with high-speed wireless circuitry 936. In certain embodiments, high-speed wireless circuitry 936 is configured to implement Institute of Electrical and Electronic Engineers (IEEE) 802.11 communication standards, also referred to herein as Wi-Fi. In other embodiments, other high-speed communications standards may be implemented by high-speed wireless circuitry 936.

Low-power wireless circuitry 924 and the high-speed wireless circuitry 936 of the eyewear device 100 can include short range transceivers (Bluetooth™) and wireless wide, local, or wide area network transceivers (e.g., cellular or WiFi). Mobile device 990, including the transceivers communicating via the low-power wireless connection 925 and high-speed wireless connection 937, may be implemented using details of the architecture of the eyewear device 100, as can other elements of network 995.

Memory 934 includes any storage device capable of storing various data and applications, including, among other things, color maps, camera data generated by the left and right visible light cameras 114A-B and the image processor 912, as well as images generated for display by the image display driver 942 on the see-through image displays 180C-D of the optical assembly 180A-B. While memory 934 is shown as integrated with high-speed circuitry 930, in other embodiments, memory 934 may be an independent standalone element of the eyewear device 100. In certain such embodiments, electrical routing lines may provide a connection through a chip that includes the high-speed processor 932 from the image processor 912 or low-power processor 922 to the memory 934. In other embodiments, the high-speed processor 932 may manage addressing of memory 934 such that the low-power processor 922 will boot the high-speed processor 932 any time that a read or write operation involving memory 934 is needed.

Server system 998 may be one or more computing devices as part of a service or network computing system, for example, that include a processor, a memory, and network communication interface to communicate over the network 995 with the mobile device 990 and eyewear device 100. Eyewear device 100 is connected with a host computer. For example, the eyewear device 100 is paired with the mobile device 990 via the high-speed wireless connection 937 or connected to the server system 998 via the network 995.

Output components of the eyewear device 100 include visual components, such as the left and right image displays 180C-D of optical elements 180A-B as described in FIGS. 2C-D (e.g., a display such as a liquid crystal display (LCD), a plasma display panel (PDP), a light emitting diode (LED) display, a projector, or a waveguide). The image displays 180C-D of the optical elements 180A-B are driven by the image display driver 942. The output components of the eyewear device 100 further include acoustic components (e.g., speakers), haptic components (e.g., a vibratory motor), other signal generators, and so forth. The input components of the eyewear device 100, the mobile device 990, and server system 998, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Eyewear device 100 may optionally include additional peripheral device elements 919. Such peripheral device elements may include biometric sensors, additional sensors, or display elements integrated with eyewear device 100. For example, peripheral device elements 919 may include any I/O components including output components, motion components, position components, or any other such elements described herein.

For example, the biometric components of the user interface field of view adjustment 900 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 925 and 937 from the mobile device 990 via the low-power wireless circuitry 924 or high-speed wireless circuitry 936.

According to some embodiments, an "application" or "applications" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating systems. In this example, the third-party application can invoke API calls provided by the operating system to facilitate functionality described herein.

Figure 12:
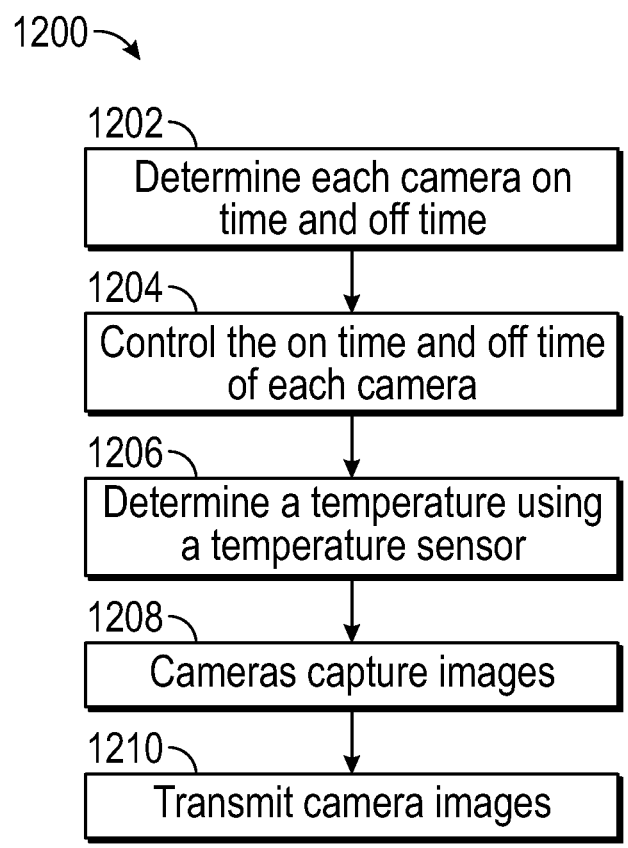
FIG. 12 is a flowchart of the operation of the eyewear device.

FIG. 12 is a flowchart 1200 of the operation of the eyewear device 100/200 and other components of the eyewear created by the high-speed processor 932 executing instructions stored in memory 934. Although shown as occurring serially, the blocks of FIG. 12 may be reordered or parallelized depending on the implementation.

At block 1202, the processor 932 determines the on time and the off time for each of cameras 114A and 114B. This is determined by the processor 932 selecting one of several camera control charts 945 stored in memory 934. Examples of available camera control charts are shown in FIG. 8 and FIG. 9. The duty cycles of each camera may be the same or different.

At block 1204, the processor 932 controls the on time and the off time for each of cameras 114A and 114B based on the selected camera control chart 945. At least one of the two cameras is at least subtantially always on, such that an image is captured by at least one camera, and such that the camera that is off cools during the off time. This also helps to control the heat in the eyewear, such as frame 105, a housing, a temple, or any combination thereof. In the example of FIG. 8, one of the cameras is on while the other camera is off In the example of FIG. 9, sometimes both cameras are on, and one camera is off at least every n seconds, for example 10 seconds.

At block 1206, the processor 932 determines the temperature of temperature sensor 940 to determine the temperature proximate one or both cameras, or proximate the processor 932 which is also generating heat. The temperature sensor is optional, and the temperature sensor may or may not be used. The processor 932 may vary the on and off times of the cameras as a function of the temperature determined by the temperature sensor 940. In one example, if the processor 932 determines the temperature read by the temperature sensor 940 is too high, the processor 932 will automatically select a different camera control chart that reduces the temperature proximate the temperature sensor 940, such as proximate the processor 932.

At block 1208, the cameras 114A-B are each set up to capture video at 36 frames per second (i.e., twice the minimum threshold for perception of fluid motion) or greater. Each visible light camera 114A-B camera is turned on to capture one or more frames and then off while the other camera captures one or more frames. Filtering may be applied by processor 932 to the captured video to improve the video, remove artifacts, or a combination thereof.

At block 1210, the images created by one or both cameras 114A-B are transmitted, for example by streaming to a display of user devices for viewing by one or multiple users. When both cameras 114A-B are on the images are rendered as a stereo image, and when only one camera is on the images are rendered as a mono image. The images may be streamed to local and remote devices for viewing.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. Eyewear, comprising:
a frame having a first side and a second side;
a see-through display supported by the frame and configured to display an object;
a first camera and a second camera coupled to the frame; and
an electronic component configured to control an on time and an off time of both the first camera and the second camera, wherein the first camera is configured to be on when the second camera is off, and wherein the second camera is configured to be on when the first camera is off, wherein the eyewear further comprises a first temperature sensor and a second temperature sensor configured to determine a temperature of the first camera and the second camera, respectively, wherein the electronic component is configured to control the on time and the off time of both the first camera and the second camera as a function of the determined temperature of the first camera and the second camera, such that when a temperature of the first camera exceeds a first temperature threshold the electronic component is configured to turn the first camera off, such that when a temperature of the second camera exceeds a second temperature threshold the electronic component is configured to turn the second camera off, wherein one of the first and second cameras is always on regardless of the temperature of the respective camera such that the camera that is on is configured to capture images while the camera that is off cools.

2. The eyewear of claim 1, wherein both the first camera and the second camera are configured to be on part of the time.

3. The eyewear of claim 2, wherein the first camera is configured to be on while the second camera is off part of the time.

4. The eyewear of claim 1, wherein the electronic component is configured to control the first camera and the second camera as a function of a first duty cycle indicative of when the first camera is on and off, and a second duty cycle indicative of when the second camera is on and off.

5. The eyewear of claim 4, wherein the first duty cycle and the second duty cycle are the same.

6. The eyewear of claim 4, wherein the first duty cycle and the second duty cycle are not the same.

7. The eyewear of claim 1, further comprising a memory storing a camera control chart configured to control when each of the first camera and the second camera are on and off.

8. A method of configuring eyewear, the eyewear having a frame, a see-through display supported by the frame and configured to display an object, a first camera and a second camera, a first temperature sensor and a second temperature sensor configured to determine a temperature of the first camera and the second camera, respectively, and a processor, the method comprising:

determining, by the processor, an on time and an off time of both the first camera and the second camera;

controlling, by the processor, a time each of the first camera and the second camera are on and off as a function of the determination; and controlling, by the processor, the on time and the off time of both the first camera and the second camera as a function of the determined temperature of the first camera and the second camera, such that when the temperature of the first camera exceeds a first temperature threshold the first camera is off, such that when a temperature of the second camera exceeds a second temperature threshold the second camera is off, wherein one of the first and second cameras is always on regardless of the temperature of the respective camera such that the camera that is on is configured to capture images while the camera that is off cools.

9. The method of claim 8, further comprising turning, by the processor, both the first camera and the second camera on part of the time.

10. The method of claim 9, further comprising turning, by the processor, the first camera on while the second camera is off part of the time.

11. The method of claim 8, further comprising the processor controlling the first camera and the second camera as a function of a first duty cycle indicative of when the first camera is on and off, and a second duty cycle indicative of when the second camera is on and off.

12. The method of claim 11, wherein the first duty cycle and the second duty cycle are the same.

13. The method of claim 11, wherein the first duty cycle and the second duty cycle are not the same.

14. The method of claim 8, further comprising:

storing, by a memory, a camera control chart configured to control when each of the first camera and the second camera are on and off; and controlling, by the processor, each of the first camera and the second camera as a function of the camera control chart.

15. A non-transitory computer-readable medium storing program code which, when executed, is operative to cause a computing device to perform the steps of:

determining, by a processor of eyewear having a first camera and a second camera and a see-through display supported by the frame and configured to display an object, an on time and an off time of both the first camera and the second camera;

controlling, by the processor, a time each of the first camera and the second camera are on and off as a function of the determination; and controlling, by the processor, the on time and the off time of both the first camera and the second camera as a function of a first temperature of the first camera and a second temperature of the second camera determined using a first temperature sensor and a second temperature sensor, such that when a temperature of the first camera exceeds a first temperature threshold the first camera off, such that when a temperature of the second camera exceeds a second temperature threshold the second camera is off, wherein one of the first and second cameras is always on regardless of the temperature of the respective camera such that the camera that is on is configured to capture images while the camera that is off cools.

16. The non-transitory computer readable medium as specified in claim 15 wherein the program code, when executed, is operative to cause the processor to turn both the first camera and the second camera on part of the time.

17. The non-transitory computer readable medium as specified in claim 15 wherein the program code, when executed, is operative to cause the processor to turn the first camera on while the second camera is off part of the time.

18. The non-transitory computer readable medium as specified in claim 15 wherein the program code, when executed, is operative to cause the processor to control the on time and the off time of both the first camera and the second camera as a function of a temperature sensor.

* * * * *